United States Patent [19]

Futami et al.

[11] Patent Number: 4,898,010
[45] Date of Patent: Feb. 6, 1990

[54] KEYLESS ENTRY SYSTEM FOR AUTOMOTIVE VEHICLES

[75] Inventors: Tohru Futami; Mikio Takeuchi, both of Kanagawa, Japan

[73] Assignee: Nissan Motor Company, Limited, Yokohama, Japan

[21] Appl. No.: 261,899

[22] Filed: Oct. 25, 1988

[30] Foreign Application Priority Data

Oct. 28, 1987 [JP] Japan .............................. 62-272394
Oct. 28, 1987 [JP] Japan .............................. 62-272395

[51] Int. Cl.$^4$ .......................................... E05B 49/00
[52] U.S. Cl. ...................................... 70/278; 70/257; 70/389
[58] Field of Search ................. 70/389, 390, 456–459, 70/277, 278, 256, 257, 276, 279–281

[56] References Cited

U.S. PATENT DOCUMENTS

| | | | |
|---|---|---|---|
| 3,708,032 | 1/1973 | Suzuki | 70/389 |
| 3,851,505 | 12/1974 | Wilkinson | 70/255 |
| 4,641,509 | 2/1987 | Batchelor | 70/389 |
| 4,672,375 | 6/1987 | Mochida | 70/257 |
| 4,719,460 | 1/1988 | Takeuchi | 70/256 |
| 4,794,268 | 12/1988 | Nakano | 70/257 |

FOREIGN PATENT DOCUMENTS

59-185270 10/1984 Japan .
61-237777 10/1986 Japan .

Primary Examiner—Robert L. Wolfe
Attorney, Agent, or Firm—Foley & Lardner, Schwartz, Jeffery, Schwaab, Mack, Blumenthal & Evans

[57] ABSTRACT

A keyless entry system comprises a locking key holder having a key lock pin, an actuator for operating the key lock pin, and a controller which detects a unique identification code of the authorized user and a preset identification code and outputs an activating signal for operating vehicular devices, such as a door lock and/or the actuator. The key may be safely kept in the locking key holder and cannot be removed therefrom unless the unique code has been received. Thus, the necessity for the user to carry a mechanical key is eliminated.

19 Claims, 8 Drawing Sheets

KEYLESS ENTRY SYSTEM FOR AUTOMOTIVE VEHICLES

BACKGROUND OF THE INVENTION

1. Field of the Invention

The present invention relates generally to a keyless entry system for operating vehicular devices. More specifically, the invention relates to a keyless entry system which operates so as to lock or unlock an ignition switch inserted into the predetermined key storing means provided in the vehicular cabin.

2. Description of the Prior Art

Recently, there have been proposed and developed various systems for unlocking the vehicular devices without using the mechanical keys, such as ignition keys.

Conventionally, such keyless entry systems function so as to operate a plurality of vehicular devices, such as a door lock device, a steering lock device, trunk opener, power window or the like. In such keyless entry system, the user transmits a unique digital code signal from a pocketable transmitter to a discrimination circuit disposed in the vehicular cabin, or the user, knowlegeable of the preset digital code, operates a digital keyboard mounted on the instrument panel of the vehicle. In these systems, the vehicular devices can operate only when the unique code from the user matches the preset digital code of the discrimination circuit.

One such keyless entry system has been disclosed in the Japanese Patent First Publication (Tokkai Showa) 61-237777, 59-185270. This and other conventional keyless entry systems are used for easily and quickly actuating only the aforementioned vehicular devices without using the mechanical key. Although the keyless entry systems operate various vehicular devices, the starter of engine is still operated by using the ignition key because otherwise accidents may happen due to malfunction of such electronic systems. For example, if the steering handle were to become locked by its lock device due to a malfunction while the vehicle is driven, the driver may be exposed to serious danger. Similarly, if the engine starter is driven unintentionally, the driver may be exposed to great danger. Therefore, the particular functions usually performed by the ignition key, such as releasing the steering lock and starting the engine, are preferably using the technical key. As a result, it is necessary for the user to carry the mechanical key. This is troublesome.

In order to overcome the problems in the prior art and allow convenient use of the keyless entry systems, there has been proposed an improved keyless entry system which never requires carrying the ignition key.

SUMMARY OF THE INVENTION

Therefore, it is a principle object of the present invention to provide a keyless entry system in which an ignition key itself is locked or unlocked in a predetermined key hole provided in a vehicular cabin, and in which the carrying of the key by the user is not necessary.

Another object of the invention is to provide a keyless entry system in which only a user having a pocket portable wireless transmitter can unlock the key inserted into a key storing means.

Further object of the invention is to provide a keyless entry system in which only a user knowledgeable of the unique digital code can unlock the key through the operation of a keyboard located in the vehicle.

In order to accomplish the aforementioned and other objects, a keyless entry system for automobiles according to the present invention, comprises input means for inputting a unique identification code signal, control means having a code memory, the control means which, when the unique identification code signal matches with a preset identification code signal stored in the memory, outputs a coincidence signal, locking key holder means disposed in the vehicular cabin for safely keeping a key, the locking key holder means which, only when receiving the coincidence signal from the control means, allows the key to be removed. The input means includes a portable transmitter or a plurality of manually operable keyboard switches. The locking key holder means includes a key receiving hole defining an internal space for receiving the key, a key lock pin normally biased in such a manner that the pin projects into the key receiving hole, and an actuator for releasing the key lock pin, said locking key holder means located in an instrument panel, an ignition key cylinder, or other mechanical key cylinders in the vehicular cabin. In the preferred embodiment, the locking key holder means includes a LED segment for illuminating the key.

According to another aspect of the invention, a keyless entry system for automobiles comprises a portable transmitter, receiving means for receiving a unique identification code signal from the portable transmitter, discriminating means for discriminating the unique identification code signal from a preset identification code signal, the discriminating means outputting a coincidence signal when these identification codes match each other, key storing means disposed in the vehicular cabin for receiving a key, key lock means for locking the key in an internal space defined by the key storing means, key lock releasing means for unlocking the key lock means in response to the coincidence signal from the discriminating means. The receiving means comprises a pair of directional antennas, each of which is designed to receive and transmit radio signals to and from the transmitter, the directivity of the pair of antennas being at right angle to each other. The discriminating means includes a CPU for wholly controlling the keyless entry system and a code memory storing the preset identification code.

According to further aspect of the invention, a keyless entry system for automobiles comprises a portable transmitter for inputting a unique identification code signal, control means having a code memory, the control means which, when the unique identification code signal matches with a preset identification code signal stored in the memory, outputs a coincidence signal, a request switch connected to the control means so that the control means outputs a request signal to the transmitter only when the request switch is manually operated, the portable transmitter transmitting the unique identification code signal in response to the request signal, locking key holder means disposed in the vehicular cabin for safely keeping a key, the locking key holder means which, only when receiving the coincidence signal from the control means, allows the key to be operated or to be removed. The request switch is mounted on an outer door handle and/or an instrument panel. The locking key holder means is located in an instrument panel, an ignition key cylinder, or other mechanical key cylinders in the vehicular cabin.

According to still further aspect of the invention, a keyless entry system for automobiles comprises input means for manually inputting a unique identification code signal, discriminating means for discriminating the unique identification code signal from a preset identification code signal, the discriminating means outputting a coincidence signal when these identification codes match each other, key storing means disposed in the vehicular cabin for receiving a key, key lock means for locking the key in an internal space defined by the key storing means, key lock releasing means for unlocking the key lock means in response to the coincidence signal from the discriminating means. The input means comprises a plurality of keyboard switches. The discriminating means includes a comparator for comparing the unique identification code with the preset identification code and a code memory storing the preset identification code. The plurality of keyboard switches are mounted on an outer door handle and/or an instrument panel.

BRIEF DESCRIPTION OF THE DRAWINGS

The present invention will be understood more fully from the detailed description given herebelow and from the accompanying drawing of the preferred embodiment of the invention, which, however, should not be taken to limit the invention to the specific embodiment, but are for explanation and understanding only.

In the drawings.

DESCRIPTION OF THE PREFERRED EMBODIMENT

First embodiment

Figure 1A:
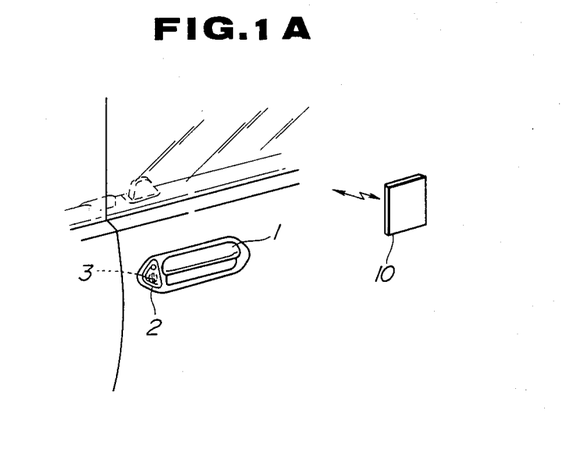
FIG. 1A is a perspective view showing a request switch of the first embodiment mounted on an outside door handle portion.

Referring now to the drawings, particularly to FIG. 1A, a request switch 2 which is a manually operable push-button-switch, is provided on outer door handle 1 and serves as an escutcheon trimming around a key cylinder 3. When the user pushes the request switch, transmitted is a unique identification code signal from a card type portable wireless transmitter 10.

Figure 2A:
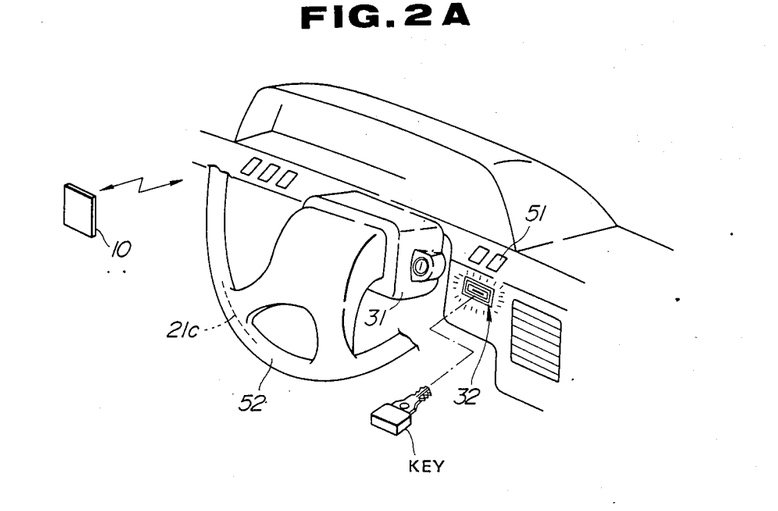
FIG. 2A is a perspective view showing an instrument panel having a key storing means and the request switch of the first embodiment in accordance with the invention.

In FIG. 2A, a locking key holder assembly 32 for holding an ignition key is disposed near a steering cover 31 of a steering column. The locking key holder assembly 32 functions so as to lock or unlock the ignition key as clearly shown in FIG. 3. The locking key holder assembly 32 consists of a key receiving hole 321 for receiving the key, a lock pin 322 actuable so as to project into the key receiving hole 321, an actuator 323 for actuating the lock pin 322, and a LED segment 324 as an illumination source.

Figures 3, 4:
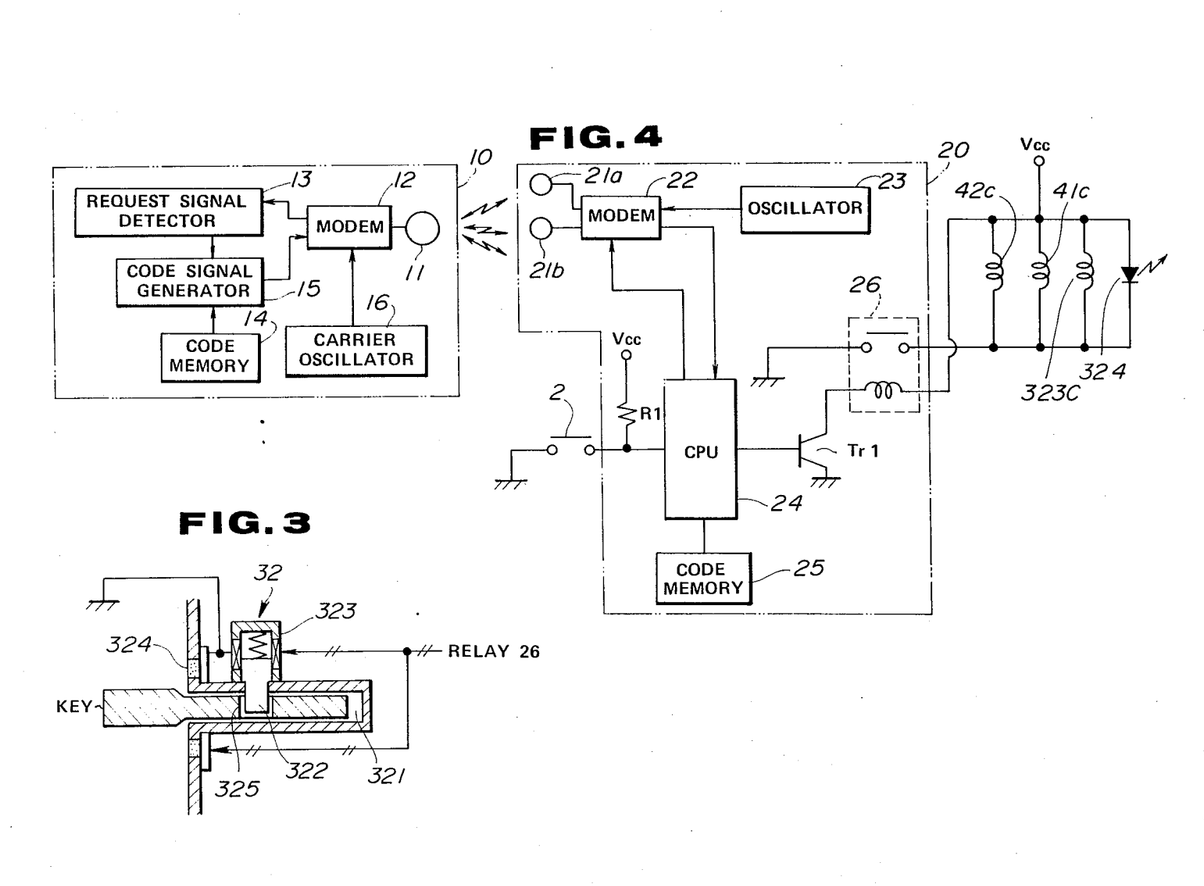
FIG. 3 is a sectional view illustrating the key storing means according to the invention.
FIG. 4 is a block diagram illustrating a control circuitry of vehicular devices of the first embodiment in accordance with the invention.

As shown in FIG. 4, the portable wireless transmitter 10 includes an antenna 11 which is so designed as to transmit and receive radio signals to and from the transmitter 10, a modem 12 which demodulates received request signals and generates output signals to be transmitted on the basis of the unique identification code, a detector 13 which detects the request signal demodulated in the modem 12, a signal generator 15 which derives the unique identification code from a code storage memory 14 and generates the unique identification code signal after detecting the request signal, and a carrier oscillator 16 for outputting a carrier signal during transmission of the unique identification signal through the transmitter 10.

On the other hand, a controller 20 provided in the vehicle, includes a pair of directional antennas 21a and 21b each of which is designed to receive and transmit radio signals to and from the transmitter 10 the directivity of said pair being at right angles to each other. The pair of antennas 21a and 21b are formed in a door mirror. Further, the controller 20 includes a modem 22 which demodulates received signals and generates output signals to be transmitted to the transmitter 10 on the basis of the request signal, a carrier oscillator 23 for outputting a carrier signal, a CPU 24 for wholly controlling a keyless entry system, a code storage memory 25 storing a preset identification code which is unique to the individual vehicle, a transistor Tr 1 which is turned on when a match between the unique identification code and the preset identification code is determined by the CPU, and a relay 26 excited by the transistor Tr 1 turned on. The relay 26 is connected to a plurality of vehicular devices, such as a coil 41c of an actuator for releasing a door lock provided in the driver seat side, a coil 42c of an actuator for releasing a door lock provided in the assistant seat side, a coil 323c of an actuator 323 for releasing the lock pin 322, and a LED segment 324 for illuminating the ignition key, respectively. Therefore, when the relay 26 is energized, the door locks are released and the lock pin 322 disappears from the inserting hole 321 of the ignition key and the LED segment 324 is activated. As clearly seen in FIG. 4, the input terminal of the CPU 24 is connected to the request switch 2. Reference numeral R1 is a pull-up resistance provided so that the CPU 24 can discriminate the trailing edge of the input signal caused when the request switch 2 is turned on.

Figure 5:
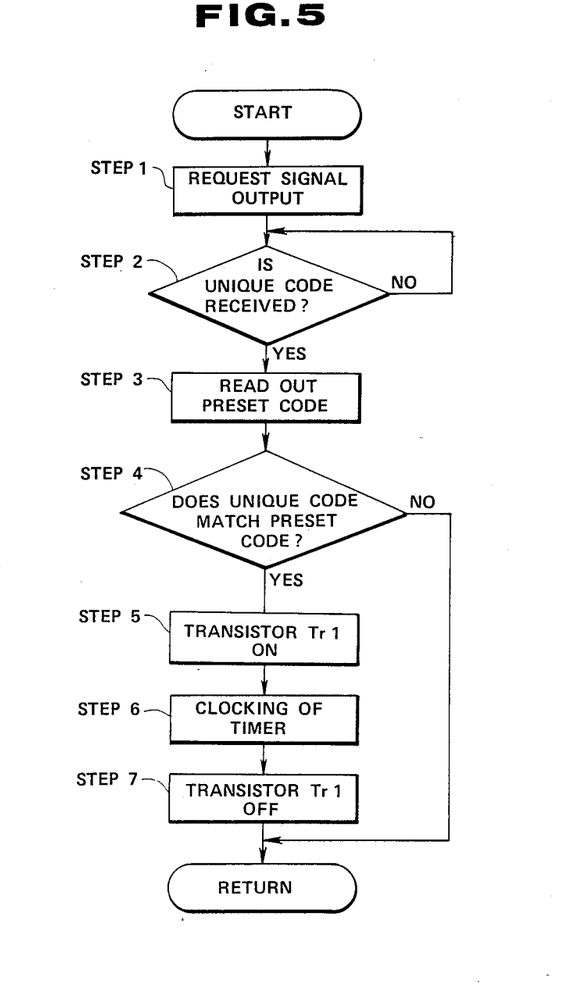
FIG. 5 is a flow chart showing the order for releasing the key inserted into the key storing means through a radio signal from a portable transmitter.

The operation of the keyless entry system of the first embodiment will be described in detail in accordance with the procedure shown in FIG. 5:

First, the request switch 2 is operated;

In Step 1, the request signal is transmitted from the antennas 21a and 21b to the antenna 11 of the portable wireless transmitter 10.

In Step 2, the request signal is received by the antenna 11 of the portable transmitter 10 and thus the request signal is detected by the detector 13 and simultaneously the unique identification code is read from the code memory 14 to the code signal generator 15. The unique code signal is outputted from the code signal generator 15 to the modem 12. After this, the modem 12 receives a carrier wave which is generated by the carrier oscillator 16, and superimposes the unique code signal on the carrier wave to form a radio signal in which the unique identification code signal rides on the carrier wave. Thus, the modem 12 transmits the unique identification code via the antennas 11 to the antennas 21a and 21b. As soon as the antennas 21a and 21b receive the unique identification code signal, the procedure is advanced to Step 3.

In Step 3, the preset identification code is read out from the code memory 25 to the CPU 24.

In Step 4, the CPU 24 collates the unique identification code signal from the transmitter 10 through the pair of antennas 21a and 21b with the preset identification code signal. When these identification code signals match with each other, the procedure is advanced to the next Step 5 in which the transistor Tr 1 is turned on. As a result, as set forth above, the relay 26 is excited, the electric current flows through the coils 41c, 42c, 323c and LED segment 324. As a result, the door lock is released and the lock pin 322 is retracted from the key receiving hole 321 and then the LED segment 324 emits light. In this condition, the ignition key plate can be pulled out.

In Step 6, a timer is activated and counts a predetermined time, for example, approximately 30 sec.

In Step 7, the transistor Tr 1 is turned off by the timer as soon as the predetermined time has elapsed. Thereafter, the aforementioned actuators and the LED segment 324 are deactivated. If in Step 4, the CPU 24 determines that the identification codes do not match, the process returns to the initial step.

The sequential operation of the keyless entry system according to first embodiment is as follows:

In getting into a vehicle, upon operation of the request switch 2 provided near the outer door handle 1 by the user carrying the portable transmitter card 10, the unique identification code is compared with the preset identification code of the controller 20 in the vehicle. If these identification codes match each other, the door locks are released and the lock pin 322 is retracted from the key receiving hole 321 in the locking key holder assembly 32 disposed in the instrument panel and simultaneously the LED segment 324 emits light for lighting the key hole of locking key holder assembly. The ignition key in the receiving hole 321 may then be pulled out. Thereafter, the steering lock can be released and the engine starter can be driven, by rotating the ignition key inserted into the key cylinder. On the other hand, since the timer is activated on releasing the door locks, the transistor Tr 1 is turned on after the predetermined time has elapsed. As a result, the doors are locked and the key lock pin 322 projects again into the receiving hole 321 and the LED segment 324 turns off. Conversely, in getting out of a vehicle, after the engine is turned off and the steering is locked by rotating the ignition key, the key is pulled out of the key cylinder. When the key plate is inserted into the receiving hole 321, the lock pin 322 is pushed upward by the key. As the lock pin 322 is normally biased in such a manner that the pin projects into the key receiving hole 321, the lock pin is finally biased into a circular opening bored in the center portion of the key plate and thus the ignition key is locked into the locking key holder assembly 32.

The modification of the first embodiment of the invention will be described hereinbelow.

As shown in FIG. 2A, this modification features an another request switch 51 in addition to the request switch 2 shown in FIG. 1A and an another antenna 21c provided in the vehicular cabin. Therefore, the user may operate the request switch 51 while seated in the driver's seat, whereafter the ignition key can be easily pulled out or inserted into the locking key holder assembly 32 in the vehicular cabin. The request switch 51 is disposed in the instrument panel. The antenna 21c is built in the steering handle 52.

Figure 6:
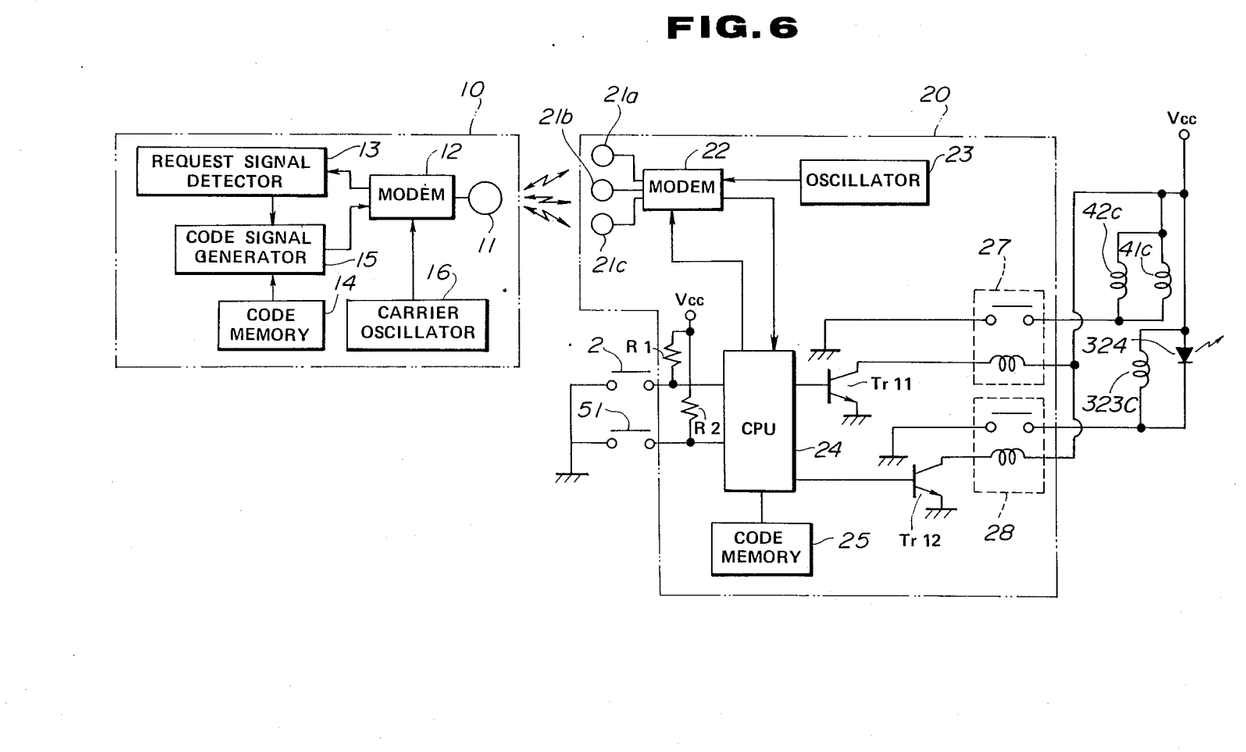
FIG. 6 is a block diagram illustrating a modification of the control circuitry of vehicular devices of the first embodiment shown in FIG. 4.

As shown in FIG. 6, the request switch 51 is connected to the input terminal of the CPU 24. The antenna 21c is also connected to the modem 22. Further, the bases of two transistors Tr 11 and Tr 12 are connected to the respective output terminals of the CPU 24. One transistor Tr 11 is provided to release the door locks. The other transistor Tr 12 is provided to release the lock pin 322. The collector of transistor Tr 11 is connected to an exciting coil of a relay 27 through which the collector is connected to a collector bias supply Vcc. The emitter of transistor Tr 11 is grounded. One end of the coils 41c and 42c of actuators for releasing the door locks is connected to the collector bias supply Vcc and the other end is grounded through the relay 27. Therefore, when transistor Tr 11 is turned on, the coil of the relay 27 is excited and electric current flows through the coils 41c and 42c and the door locks are released. On the other hand, the collector of transistor Tr 12 is connected to an exciting coil of a relay 28 through which the collector is connected to the collector bias supply Vcc. The emitter of transistor Tr 11 is grounded. One lead of the coil 323c of actuator for releasing the key lock pin and the LED segment 324 are connected to the collector bias supply Vcc and the other leads are grounded through the relay 28. Therefore, when transistor Tr 12 is turned on, the coil of the relay 28 is excited and electric current flows through the coil 323c and the LED segment 324. As will be appreciated from the above, in the modification of the first embodiment of the invention, the door locks are released by operating the first request switch 2 and subsequently the key lock pin 322 is released and the LED segment 324 emits light by operating the second request switch 51. Thus, the operation of the modification of first embodiment is different from that of the first embodiment in that the first request switch operates only the door locks and the second request switch operates only the actuator for releasing the key lock pin and LED segment.

Figure 7A:
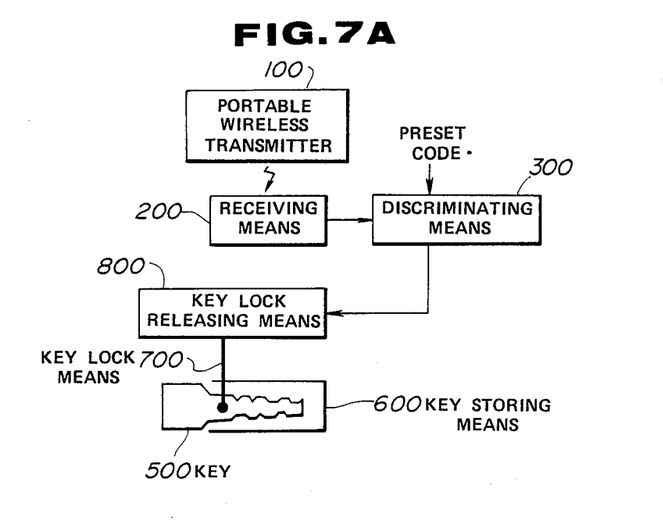
FIG. 7A is a plan view illustrating an essential portion of a keyless entry system of the first embodiment according to the present invention.

As shown in FIG. 7A, the keyless entry system of the first embodiment according to the invention will operate as follows:

The unique identification code signal from a card-type portable wireless transmitter 100 outputs to a receiving means 200;

Next, a discriminating means 300 collates the unique identification signal with the preset identification signal;

When the unique identification signal matches the preset identification signal, the discriminating means 300 outputs an output signal and a key lock releasing means 800 is operated and a key lock means 700 is released. As a result, an ignition key 500 can be pulled out of a key storing means 600. In this manner, the ignition key 500 can be safely kept in the key storing means 600. Therefore, the user is freed from the necessity of carrying the key.

Second embodiment

The same reference numerals used in the first embodiment will be applied to the corresponding elements used in the second embodiment for the purpose of comparison between the first and second embodiments.

Figure 1B:
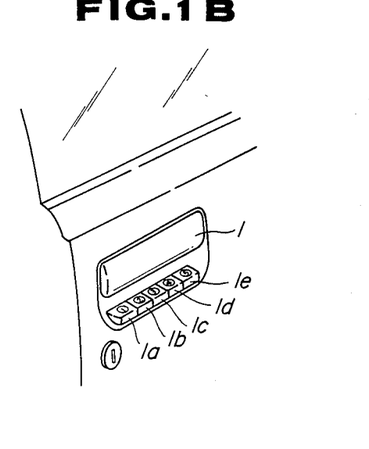
FIG. 1B is a perspective view showing a keyboard assembly of the second embodiment mounted on the outside door handle portion.

As shown in FIG. 1B, the second embodiment is different from the first embodiment in that input keyboard switches 1a to 1e are provided on the outer door handle 1 by which the unique identification code is manually inputted by the authorized user. The input keyboard switches 1a to 1e are identified as numerals (1,2), (3,4), (5,6), (7,8), and (9,0), respectively. A unique identification code comprised of five figure number for example may be inputted by the operation of the five keyboard switches.

Figure 2B:
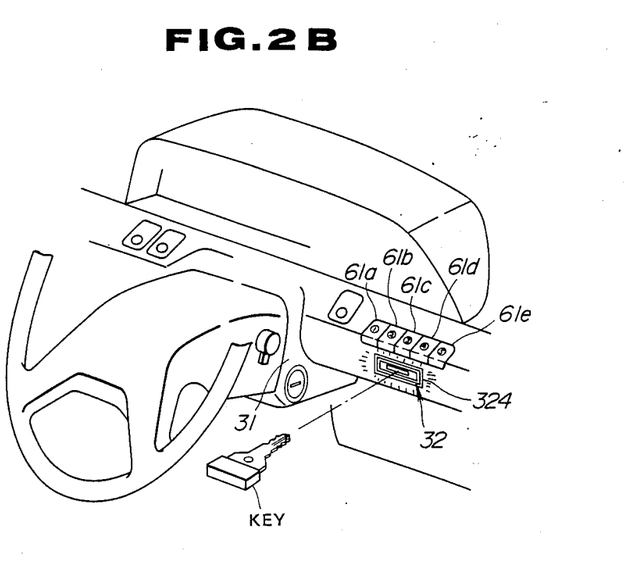
FIG. 2B is a perspective view showing the instrument panel having the key storing means and the keyboard assembly of the second embodiment in accordance with the invention.

As shown in FIG. 2B, the locking key holder assembly 32 is the same as that shown in FIGS. 2A and 3.

Figure 8:
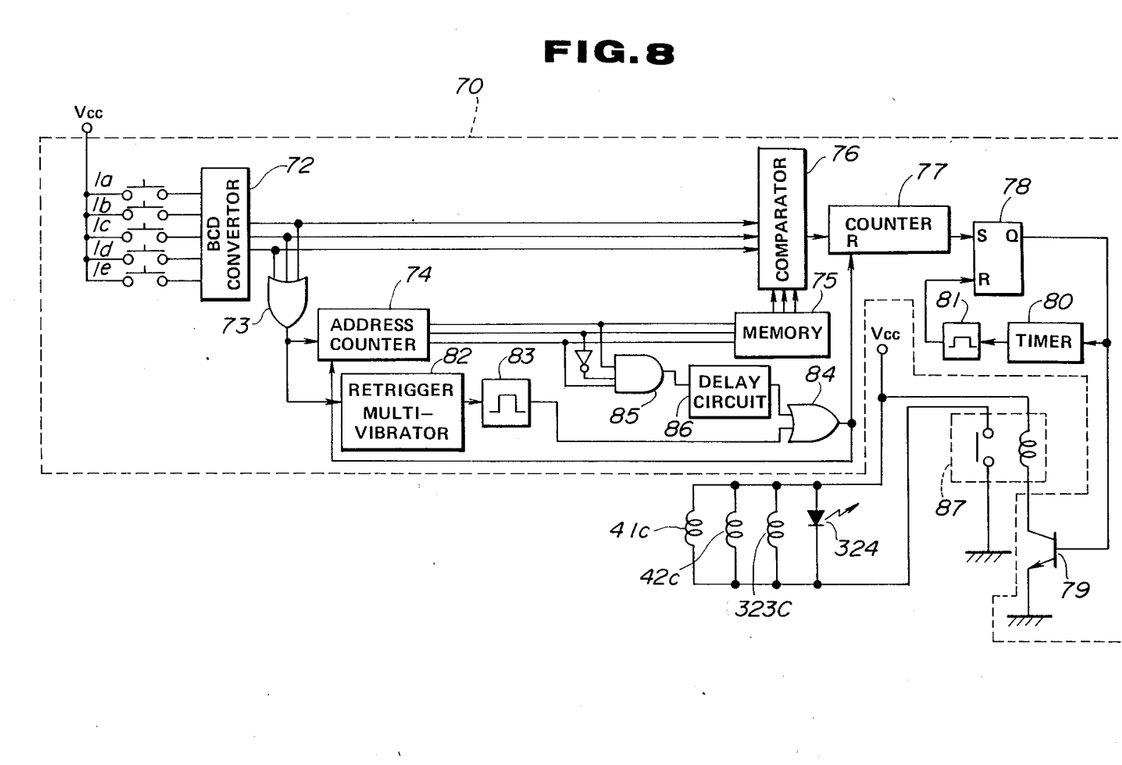
FIG. 8 is a block diagram illustrating the control circuitry of the vehicular devices of the second embodiment according to the invention.

FIG. 8 illustrates a controller 70 of a keyless entry system including a plurality of keyboard switches 1a, 1b, 1c, 1d, and 1e for inputting the unique identification code, a binary coded decimal convertor (BCD convertor) 72 for converting outputted signals generated by the operation of keyboard switches into binary coded decimals, an OR-gate circuit 73 for producting a logical sum of the input signals from the BCD convertor 72, an address counter 74 for outputting address signals of "1" to "5" in response to the output signals from the BCD convertor 72, and a memory 75 consisting of a programmable read only memory (PROM) or a random access memory (RAM). Further, the controller 70 comprises a comparator 76 which compares each output signal representative of figures from the BCD convertor 72 with each output signal representative of figures from the memory 75 and then outputs a high-level logic signal when the output signal from the BCD convertor matches with the output signal from the memory, a quinary counter 77 which counts the high-level logic signal from the comparator 76 for each figure number and outputs a high-level logic signal when the count reaches "5", a RS flip-flop circuit 78 which is set by the output signal supplied from the quinary counter 77 and outputs a coincidence signal for a predetermined time. Transistor 79 is then turned on and simultaneously a timer 80 starts clocking in accordance with the output signal from the flip-flop circuit 78. As soon as the elapse of the predetermined time is determined by the timer 80, a one shot multi-vibrator 31 is triggered and the RS flip-flop is reset with the result that the transistor 79 is turned off.

Furthermore, the controller 70 includes a retrigger multi-vibrator 82 which is triggered in response to the output signal of the OR-gate 73 and a one-shot multi-vibrator 83 which outputs a pulse signal for the predetermined time on the trailing edge of output signal of the retrigger multi-vibrator 82. The one-shot multi-vibrator 83 resets the quinary counter 77 through the OR-gate 73 when the predetermined time has elapsed. Moreover, the controller 70 includes an AND-gate circuit 85 which generates a logical product, a delay circuit 86 which delays the output signal of the AND-gate 85 for the predetermined time, and an OR-gate 84 which generates a logical sum from the output of the one-shot multi-vibrator 83 and the output of the delay circuit 86. In this construction, when the address counter 74 outputs an address signal indicative of the binary numeral "101" which corresponds to a decimal "5", the AND-gate 85 outputs a high-level logic signal. The high-level logic signal goes to the delay circuit 86 and goes to the OR-gate 84 after the elapse of the predetermined time. The output signal from the OR-gate 84 resets the quinary counter 77.

When the transistor 79 is turned on in response to the output signal from the RS flip-flop circuit 78 electric current flows into the coils 41c, 42c, 323c, and the LED segment 324 through a relay 87. In this manner, door lock actuators and key lock pin actuator is activated and the LED segment emits a light. As clearly seen in FIGS. 8 and 4, the activating circuit of the coils and LED illustrated in FIG. 8 is the same as that illustrated in FIG. 4.

The sequential operation of the keyless entry system according to second embodiment is as follows:

In getting into the vehicle, when the user operates the input keyboard switches 1a to 1e provided near the outer door handle 1 according to the predetermined unique identification code, the output signals from the switches are converted into a binary coded decimal by the BCD convertor 72 and then sent to the comparator 76 and also through the OR-gate 73 to the address counter 74. The address counter 74 takes one step at every operation of the keyboard switch. Therefore, since the address counter 74 outputs an address signal "1" to the memory 75 in response to the first operation of input keyboard switch, the preset identification code tored in the first address of the memory 75 is outputted to the comparator 76. In this way, the comparator 76 compares the unique identification code signal from the BCD convertor 72 with the preset identification code signal from the memory 75 for every numeral of the identification code. If the unique code matches with the preset code, the comparator 76 outputs a binary signal "1". The quinary counter 77 counts these binary signal from comparator 76. If the unique code inputted from keyboard switch matches with the preset code from the memory 75 five times, the comparator 76 outputs the binary signal "1" five times, and the quinary counter 77 outputs a coincidence signal to the RS flip-flop circuit 78 after counting the binary signal "1" five times. On the basis of this coincidence signal, the RS flip-flop 78 is set. As a result, the flip-flop 78 outputs a high-level signal through its Q terminal to the base of the transistor 79, and the transistor 79 is turned on with the result that the relay 87 is excited and subsequently electric current flows into the coils 41c, 42c, 323c, and LED segment 324. After this, the door locks are released and the key lock pin is retracted from the key receiving hole and the LED segment is turned on. The doors are locked and the lock pin projects into the key receiving hole and the LED segment is put off, after the timer 80 counting the predetermined time (approximately 30 sec).

When getting out of the vehicle, the operation of keyless entry system of the second embodiment shown in FIG. 8 is identical with that of the first keyless entry system shown in FIG. 4.

As will be appreciated from the above, the construction of the controller 20 of the first embodiment is different from that of the controller 70 of the second embodiment, but the function of both keyless entry systems is entirely equal.

A modification of the second embodiment of the invention will be described hereinbelow.

As shown in FIG. 2B, this modification comprises another input keyboard switches 61a to 61e disposed in the instrument panel in addition to the input keyboard switches 1a to 1e shown in FIG. 1B. Therefore, the user may operate the keyboard switches 61a to 61e in accordance with the unique identification code while seated in the driver's seat, so that the ignition key can be pulled out of the locking key holder assembly 32 in the vehicular cabin.

Figure 9:
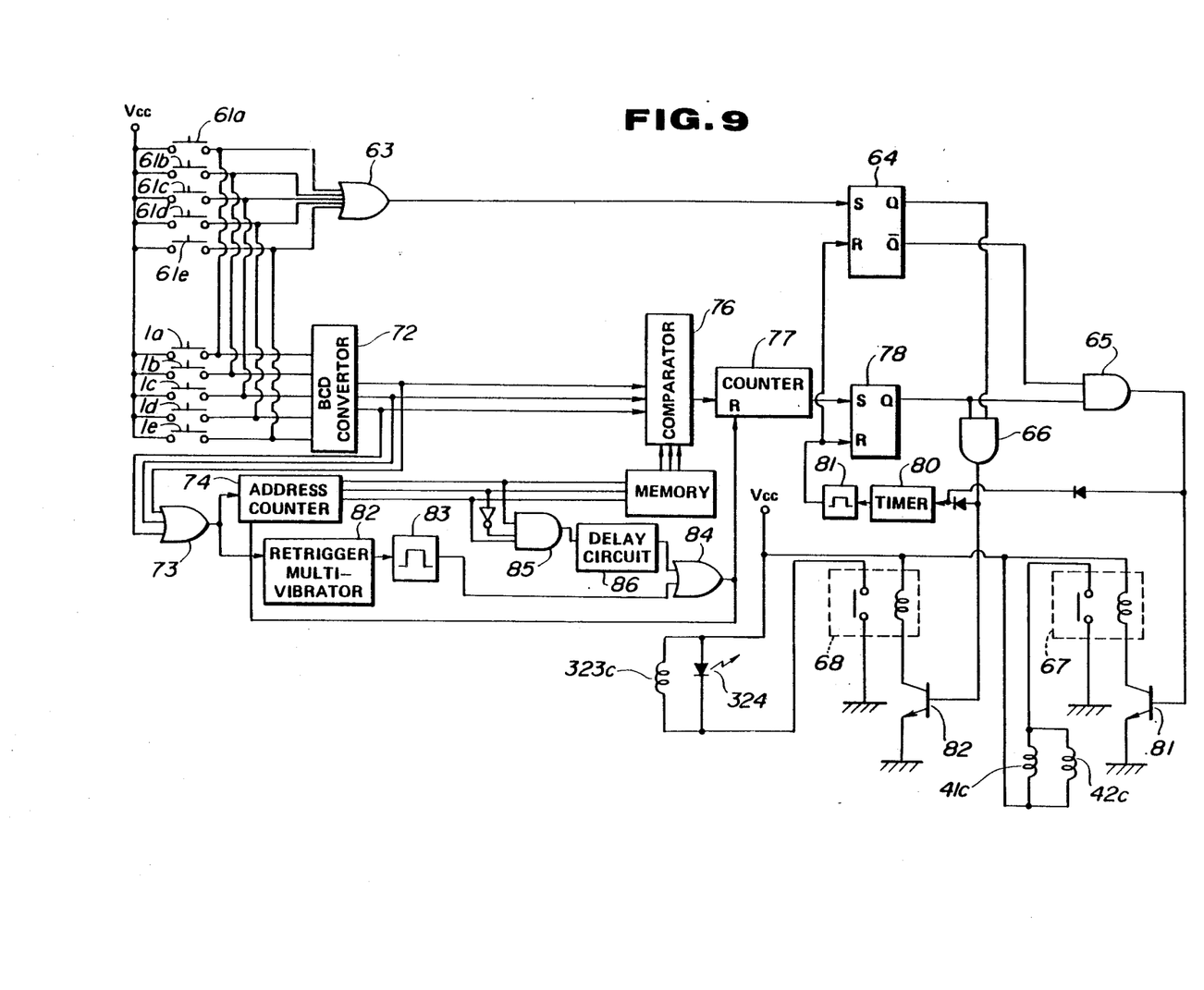
FIG. 9 is a block diagram illustrating the modification of the control circuitry of the second embodiment shown in FIG. 8.

As shown in FIG. 9, the keyboard switches 61a to 61e are connected to an OR-gate circuit 63 which is connected to the S terminal of a RS flip-flop circuit 64. The flip-flop 64 is set by the output signal from the OR-gate. Further, the bases of two transistors 81 and 82 are connected to the output terminals of the AND-gate 65 and 66, respectively. Transistor 81 functions to release the door locks. Transistor 82 functions to release the lock pin 322 and to activate the LED segment 324. The collectors of transistors 81 and 82 are connected to the respective exciting coils of relays 67 and 68 through which each collector is connected to a collector bias supply Vcc, while the emitters of the transistors 81 and 82 are grounded. One lead of each of the respective coils 41c and 42c of actuators for releasing the door locks is connected to the collector bias supply Vcc and the other lead is grounded through the relay 67. On the other hand, one lead of the coil 323c and the LED segment 324 respectively is connected to the collector bias supply Vcc and the other is grounded through the relay 68.

The two input terminals of the AND gate 65 are also connected to the output terminal Q of the flip-flop 78 and the inverted output terminal $\overline{Q}$ of the flip-flop 64. On the other hand, the two input terminals of the AND-gate 66 are connected to the respective output terminals Q of the flipflop circuits 64 and 78.

When the unique identification code matches with the preset identification code in response to the operation of the input keyboard switches 1a to 1e, the high-level signals are simultaneously outputted from the respective output terminals Q and $\overline{Q}$ of the flip-flop 78 and 64 to the AND-gate 65. As a result, the AND-gate outputs an output signal to the transistor 81. Therefore, the transistor 81 is turned on with the result that the relay 67 is magnetized and the door locks are released. On the other hand, one input terminal of AND-gate 66 receives the low-level logical signal from the output terminal Q of the flip-flop 64. Therefore, the actuator of key lock pin 322 remains deactivated.

Next, when the user operates the input keyboard switches 61a to 61e while seated in the driver's seat and the unique identification code matches the preset identification code, the two input terminals of AND-gate 66 receives the high-level logical signals from the respective output terminals Q of the flip-flop 64 and 78, and while one input terminal of AND-gate 65 receives the low-level logical signal from the inverted output terminal $\overline{Q}$ of the flip-flop 64. As a result, only the AND-gate 66 outputs an output signal to the transistor 82 with the result that the key lock pin 322 retracts from the key receiving hole 321 and the LED segment 324 emits light.

Thus, the modification of the second embodiment is different in that manual operation of input keyboard switches 1a to 1e unlocks only the doors and manual operation of input keyboard switches 61a to 61e unlocks only the locking key holder.

Figure 7B:
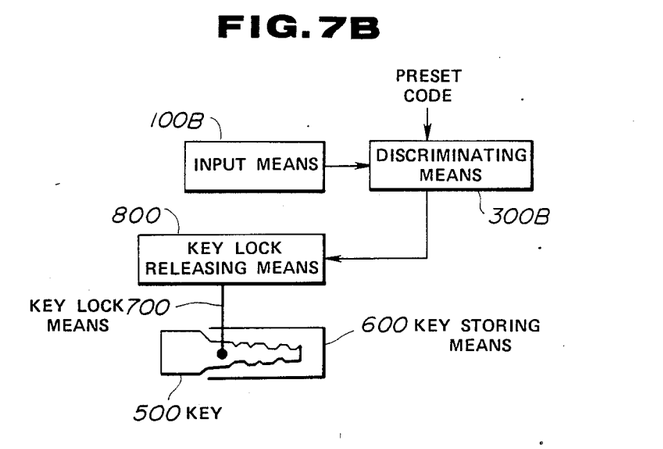
FIG. 7B is a plan view illustrating an essential portion of a keyless entry system of the second embodiment according to the present invention.

As shown in FIG. 7B, the keyless entry system of the second embodiment according to the invention will operate as follows:

The unique identification code from an input means 100B is output to a discriminating means 300B;

Next, the discriminating means 300B collates the unique identification signal with the preset identification signal;

The subsequent operation is equal to that shown in FIG. 7A.

While the essential elements of a single controller are shared by the respective terminals of the modified embodiments. The first and second request switches, or the first and second keyboard switches respectively may have mutually separate controllers.

While the locking key holder assembly of the present embodiment is fixed in the instrument panel of vehicles, the key lock hole assembly may be slidable.

Moreover, although the locking key holder assembly of the instant embodiment is fixed in the instrument panel, a mechanical key cylinder, such as an ignition key cylinder, a glove box key cylinder or the like may function as the locking key holder device. In such construction, when the locking key holder device is activated, the key may be removed from the mechanical key cylinder or be operated in the mechanical key cylinder.

Although the present invention has been disclosed in terms of keyless entry systems for automobiles, it is not intended to limit the scope of the invention to such keyless entry systems. The invention may be embodied in other specific forms without departing from the spirit or essential characteristics thereof. Therefore, the invention should be understood in all respects as defined by the appended claims rather than by the foregoing description and all modifications which come within the meaning and range of equivalency of the claims are therefore intended to be embraced therein.

What is claimed is:

1. A keyless entry system for automobiles comprising:
   input means for inputting a unique identification code signal;
   control means having a code memory, said control means which, when said unique identification code signal matches with a preset identification code signal stored in said memory, outputs a coincidence signal;
   locking key holder means disposed in the vehicular cabin for safely keeping a key, said locking key holder means which, only when receiving said coincidence signal from said control means, allows the key to be operated or to be removed.

2. A keyless entry system as set forth in claim 1, wherein said input means includes a portable transmitter or a plurality of manually operable keyboard switches.

3. A keyless entry system as set forth in claim 1, wherein said locking key holder means includes a key receiving hole defining an internal space for receiving said key, a key lock pin normally biased in such a manner that said pin projects into said key receiving hole, and an actuator for releasing said key lock pin.

4. A keyless entry system as set forth in claim 3, wherein said locking key holder means is located in an instrument panel in the vehicular cabin.

5. A keyless entry system as set forth in claim 4, wherein said locking key holder means further includes a LED segment for illuminating the key.

6. A keyless entry system for automobiles comprising:
a portable transmitter;
receiving means for receiving a unique identification code signal from said portable transmitter;
discriminating means for discriminating said unique identification code signal from a preset identification code signal, said discriminating means outputting a coincidence signal when these identification codes match each other;
key storing means disposed in the vehicular cabin for receiving a key;
key lock means for locking said key in an internal space defined by said key storing means;
key lock releasing means for unlocking said key lock means in response to said coincidence signal from said discriminating means.

7. A keyless entry system as set forth in claim 6, wherein said receiving means comprises a pair of directional antennas, each of which is designed to receive and transmit radio signals to and from said transmitter, the directivity of said pair of antennas being at right angles to each other.

8. A keyless entry system as set forth in claim 6, wherein said discriminating means includes a CPU for totally controlling said keyless entry system and a code memory storing said preset identification code.

9. A keyless entry system as set forth in claim 6, wherein said key lock means includes a key lock pin normally biased in such a manner that said pin projects into said key storing means.

10. A keyless entry system as set forth in claim 6, wherein said key lock releasing means includes an actuator activating according to said coincidence signal.

11. A keyless entry system for automobiles comprising:
a portable transmitter for inputting a unique identification code signal;
control means having a code memory, said control means which, when said unique identification code signal matches with a preset identification code signal stored in said memory, outputs a coincidence signal;
a request switch connected to said control means so that said control means outputs a request signal to said transmitter only when said request switch is manually operated;
said portable transmitter transmitting said unique identification code signal in response to said request signal;
locking key holder means disposed in the vehicular cabin for safely keeping a key, said locking key holder means which, only when receiving said coincidence signal from said control means, allows the key to be operated or to be removed.

12. A keyless entry system as set forth in claim 11, wherein said request switch is mounted on an outer door handle and/or an instrument panel.

13. A keyless entry system as set forth in claim 11, wherein said key locking holder means is located in an instrument panel, an ignition key cylinder or other mechanical key cylinders in the vehicular cabin.

14. A keyless entry system for automobiles comprising:
input means for manually inputting a unique identification code signal;
discriminating means for discriminating said unique identification code signal from a preset identification code signal, said discriminating means outputting a coincidence signal when these identification codes match each other;
key storing means disposed in the vehicular cabin for receiving a key;
key lock means for locking said key in an internal space defined by said key storing means;
key lock releasing means for unlocking said key lock means in response to said coincidence signal from said discriminating means.

15. A keyless entry system as set forth in claim 14, wherein said input means comprises a plurality of keyboard switches.

16. A keyless entry system as set forth in claim 14, wherein said discriminating means includes a comparator for comparing said unique identification code with said preset identification code and a code memory storing said preset identification code.

17. A keyless entry system as set forth in claim 14, wherein said key lock means includes a key lock pin normally biased in such a manner that said pin projects into said key storing means.

18. A keyless entry system as set forth in claim 14, wherein said key lock releasing means includes an actuator activating according to said coincidence signal.

19. A keyless entry system as set forth in claim 14, wherein said plurality of keyboard switches are mounted on an outer door handle and/or an instrument panel.

* * * * *